US012692920B2

(12) United States Patent
 Shahin

(10) Patent No.: US 12,692,920 B2
(45) Date of Patent: Jul. 28, 2026

(54) CALIPER BRAKE

(71) Applicant: HL MANDO CORPORATION,
 Pyeongtaek (KR)

(72) Inventor: Hatem Shahin, Pfaffenhofen (DE)

(73) Assignee: HL MANDO CORPORATION,
 Pyeongtaek (KR)

( * ) Notice: Subject to any disclaimer, the term of this
 patent is extended or adjusted under 35
 U.S.C. 154(b) by 415 days.

(21) Appl. No.: 18/498,050

(22) Filed: Oct. 31, 2023

(65) Prior Publication Data

US 2024/0376946 A1 Nov. 14, 2024

(51) Int. Cl.
 *F16D 65/18* (2006.01)
 *F16D 121/04* (2012.01)
 *F16D 125/06* (2012.01)

(52) U.S. Cl.
 CPC .......... *F16D 65/18* (2013.01); *F16D 2121/04*
 (2013.01); *F16D 2125/06* (2013.01); *F16D*
 *2250/0084* (2013.01)

(58) Field of Classification Search
 CPC .. F16D 65/18; F16D 2121/04; F16D 2125/06;
 F16D 2250/0084
 USPC ........................................................ 188/72.4
 See application file for complete search history.

(56) References Cited

U.S. PATENT DOCUMENTS

| | | | |
|---|---|---|---|
| 4,181,145 A | * | 1/1980 | Mitchell ............... F16K 15/147 |
| | | | 188/71.9 |
| 4,306,635 A | | 12/1981 | Mitchell |
| 5,035,305 A | * | 7/1991 | Lammers ............... F16D 55/40 |
| | | | 188/73.38 |
| 9,205,825 B2 | * | 12/2015 | Isono .................... B60T 13/588 |
| 2014/0041970 A1 | | 2/2014 | Burgoon |

FOREIGN PATENT DOCUMENTS

| | | | |
|---|---|---|---|
| DE | 29724807 U1 * | 4/2004 | ......... F16D 65/0018 |
| JP | 07042769 A | 2/1995 | |
| JP | 2009-156292 A | 7/2009 | |
| KR | 10-0688458 B1 | 3/2007 | |
| KR | 2016-0076526 A | 6/2016 | |

OTHER PUBLICATIONS

DE Office Action dated Jan. 17, 2024.

* cited by examiner

*Primary Examiner* — Christopher P Schwartz

(74) *Attorney, Agent, or Firm* — Harvest IP Law, LLP

(57) ABSTRACT

The disclosed caliper brake includes a piston configured to move forward and backward in an axial direction and a back plate provided to face a front side of the piston, wherein the piston is provided with a suction plate provided on a front surface of the piston and having a center concavely formed rearward to adsorb the back plate during the piston moving forward.

4 Claims, 4 Drawing Sheets

CALIPER BRAKE

CROSS-REFERENCE TO RELATED APPLICATION

This application claims the benefit of German Patent Application No. 102023204467.6, filed on May 12, 2023, in the German Patent Office (DPMA), the disclosures of which are incorporated herein by reference in its entirety.

BACKGROUND

1. Technical Field

Embodiments of the present disclosure relate to a caliper brake, and more particularly, to a caliper brake in which a suction layer is provided on a piston to minimize a drag torque generated during traveling of a vehicle.

2. Description of the Related Art

In general, vehicles necessarily include brake systems for braking. A drum

Generally, a vehicle necessarily includes a braking system for braking. In a caliper brake which is one braking system, a hydraulic or electronic press member and a brake pad are mounted on a side surface of a brake disc which rotates with a vehicle wheel. When a pedal is pressed, the brake pad is pressed against the brake disc, and thus a frictional force is generated and used as a braking force to stop a vehicle.

Specifically, when a vehicle brakes, a piston moves forward to press a rear side of a back plate, the back plate moves forward with the piston, and thus a brake pad provided in front of the back plate comes into contact with a brake disc to generate the fractional force.

On the other hand, when a vehicle travels again after braking, a predetermined distance should be secured between the brake pad and the brake disc. That is, when the piston moves backward, the back plate and the brake pad of the back plate also have to move backward with the piston. However, in the conventional caliper brake, since the back plate does not completely move backward during traveling of the vehicle, a phenomenon in which the brake disc and the brake pad come into partial and temporary contact with each other occurs, which is called a drag torque phenomenon.

Therefore, a device capable of improving fuel efficiency of a vehicle by preventing the drag torque problem is required in a caliper brake.

SUMMARY

Therefore, it is an aspect of the present disclosure to provide a caliper brake capable of preventing a drag torque phenomenon in which a brake pad comes into contact with a brake disc in a braking state of a vehicle.

It is another aspect of the present disclosure to provide a caliper brake which improves fuel efficiency of a vehicle.

It is still another aspect of the present disclosure to provide a caliper brake capable of preventing a drag torque phenomenon using a simple configuration and coupling structure to reduce costs of a vehicle and improve productivity.

In order to solve the given task, a caliper brake according to claim 1 is proposed. Particular embodiments are disclosed in the dependent claims.

In accordance with one aspect of the present disclosure, a caliper brake includes a piston configured to move forward and backward in an axial direction and a back plate provided to face a front side of the piston, wherein the piston is provided with a suction plate provided on a front surface of the piston and having a center concavely formed rearward to adsorb the back plate.

The suction plate may be provided as a plurality of suction plates disposed on an edge of the front surface of the piston.

The suction plate may be disposed in contact with an adjacent suction plate.

The suction plate may be disposed to be spaced apart from an adjacent suction plate.

The suction plates may be radially and symmetrically disposed with respect to an axis of the piston.

The piston may include a screw or rivet configured to fix the suction plate to the front surface.

The suction plate may be formed of at least one of a metal, a plastic, and rubber.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EMBODIMENTS

Figure 1:
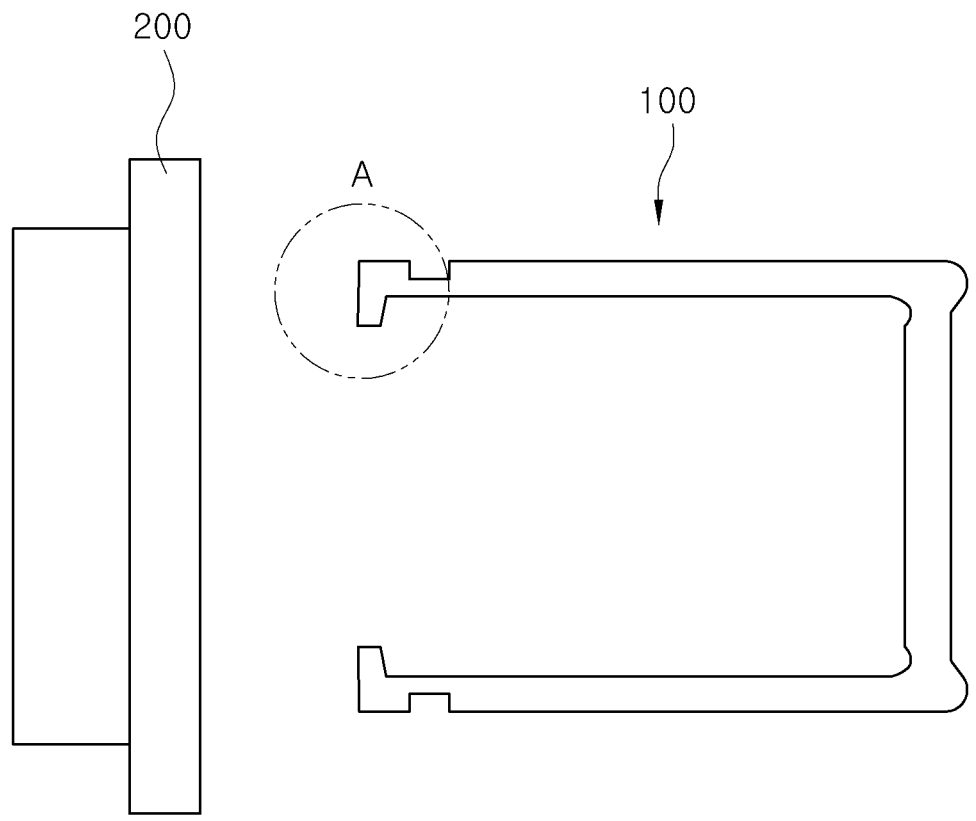
FIG. 1 is a side view illustrating a conventional piston having a hollow shape and a back plate of which a front side is provided with a brake pad.

Hereinafter, embodiments of the present disclosure will be described in detail with reference to the accompanying drawings. The following embodiments are to provide the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

FIG. 1 is a side view illustrating a conventional piston 100 having a hollow shape and a back plate 200 of which a front side is provided with a brake pad.

Referring to FIG. 1, a caliper brake may include the piston 100 and the back plate 200. Specifically, the piston 100 may receive a hydraulic pressure or mechanical force to move forward and backward in an axial direction. The piston 100 may have a hollow shape. The back plate 200 is provided to face a front side of the piston 100. In this case, the front side of the piston 100 is a left side of the piston 100 based on FIG. 1, and a rear side of the piston 100 is a right side of the piston 100. A front side and a rear side of the back plate 200 have meanings in the same manner. All front sides and rear sides expressed below have meanings in the same manner.

A brake pad may be provided on the front side of the back plate 200. Accordingly, when the brake starts braking and the piston 100 moves forward, the front side of the piston 100 presses the rear side of the back plate 200. Then, the back plate 200 moves forward, and the brake pad provided on the front side of the back plate 200 comes into contact with a brake disc.

When the brake stops the braking and then the vehicle starts to travel, the piston 100 moves backward. However, since the back plate 200 is not directly connected to the piston 100, the back plate 200 does not immediately move backward with the piston 100. In addition, the back plate 200 moved backward may be in partial and temporary contact with the rotating brake disk which rotates during traveling of the vehicle. This is referred to as a drag torque phenomenon, and a drag torque causes a problem of generating an unnecessary braking force and thus reducing fuel efficiency. Accordingly, in an embodiment of the present disclosure, a suction plate 110 is provided at portion A of FIG. 1 to prevent the drag torque problem to improve fuel efficiency of the vehicle.

Figure 2:
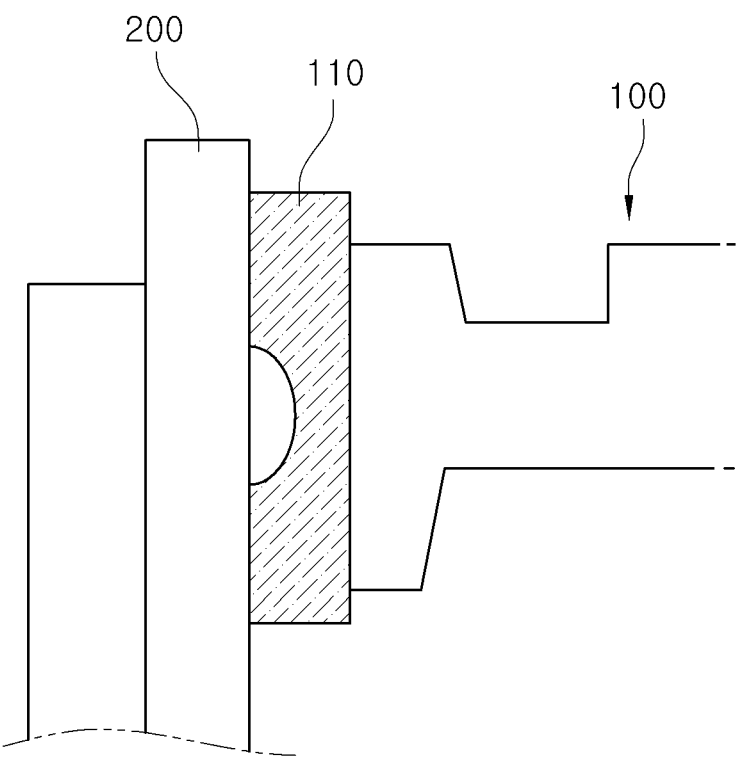
FIG. 2 is an enlarged view illustrating a state of a piston provided with a suction plate before or after a brake performs braking after a portion corresponding to portion A of FIG. 1 is enlarged according to an embodiment of the present disclosure.
Figure 3:
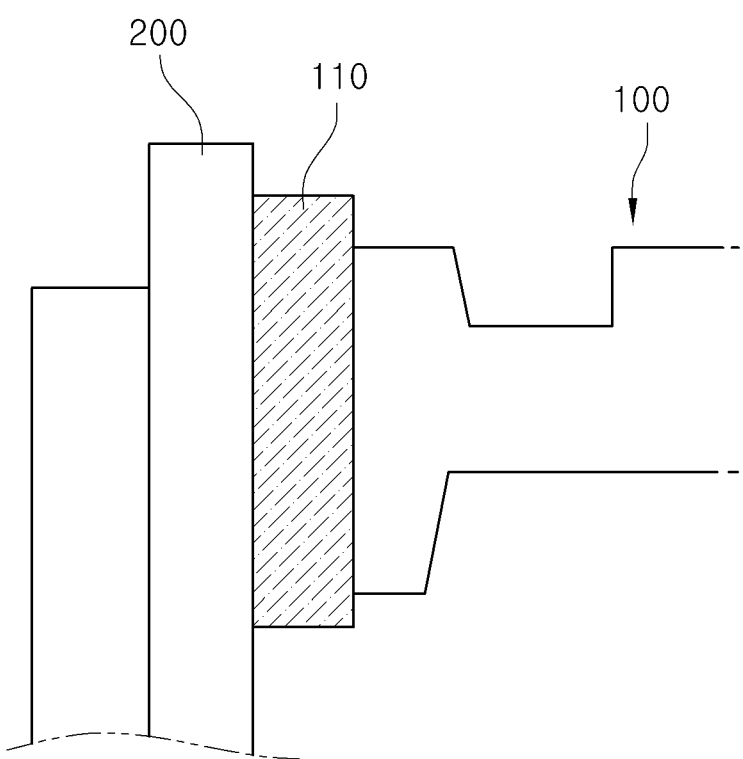
FIG. 3 is an enlarged view illustrating a compressed state of the piston provided with the suction plate due to the braking of the brake after the portion corresponding to portion A of FIG. 1 is enlarged according to the embodiment of the present disclosure.

FIG. 2 is an enlarged view illustrating a state of a piston 100 provided with a suction plate 110 before or after a brake performs braking after a portion corresponding to portion A of FIG. 1 is enlarged according to an embodiment of the present disclosure, and FIG. 3 is an enlarged view illustrating a compressed state of the piston 100 provided with the suction plate 110 due to the braking of the brake after the portion corresponding to portion A of FIG. 1 is enlarged according to the embodiment of the present disclosure.

Referring to FIGS. 2 and 3, the piston 100 may be provided with the suction plate 110 provided on a front side of the piston 100 and formed of at least one of a metal, a plastic, and rubber.

The suction plate 110 is provided on a front surface of the piston 100, and a center of the suction plate 110 is concavely formed rearward. Accordingly, when the piston 100 moves forward, the suction plate 110 may adsorb the back plate 200. Specifically, according to the embodiment of the present disclosure, when braking of the vehicle starts and the piston 100 moves forward, as in FIG. 2, the suction plate 110 provided on the front surface of the piston 100 comes into contact with a rear surface of the back plate 200. In this case, air fills a space provided in the middle of the suction plate 110. Then, when the piston 100 moves forward, the space provided in the middle of the suction plate 110 becomes smaller and the air is compressed. Then, when the piston 100 moves forward further, as in FIG. 3, the air in the space provided in the middle of the suction plate 110 is discharged to the outside and the suction plate 110 suctions the rear surface of the back plate 200.

When the braking of the brake is completed and traveling of the vehicle starts, the piston 100 moves backward. In this case, unlike the conventional caliper brake, the back plate 200 suctioned by the suction plate 110 receives an external force pulling the back plate 200 rearward with the piston 100. After the back plate 200 receives a certain external force, when air flows into the space provided in the middle of the suction plate 110, coupling between the suction plate 110 and the back plate 200 is uncoupled. Accordingly, since the piston 100 includes the suction plate 110, a drag torque phenomenon in which the brake pad is in contact with the brake disc can be directly prevented.

In FIGS. 2 and 3, although portion A of FIG. 1 is enlarged and illustrated, this is partially illustrated for the sake of convenience, and in a lower portion symmetrical to portion A with respect to an axis of the piston 100 in FIG. 1, a suction layer may also be provided like FIGS. 2 and 3.

The suction plate 110 is fixed to the front surface of the piston 100. In this case, the suction plate 110 and the piston 100 may be coupled using an adhesive, or the suction plate 110 and the piston 100 may be coupled using a nail, a screw (not shown), or a rivet (not shown). Alternatively, the suction plate 110 and the piston 100 may be coupled using a combination of an adhesive, a nail, a screw (not shown), a rivet (not shown), and the like.

A curvature or size of the space provided in the middle of the suction plate 110 may be set differently according to the types of caliper brake and piston 100. The curvature or size may be precisely designed through computer aided engineering (CAE). That is, the space provided in the middle of the suction plate 110 in the present disclosure is not limited to a specific shape according to the embodiment of the present disclosure and has any shape and arrangement sufficient for suctioning the back plate 200.

Figure 4:
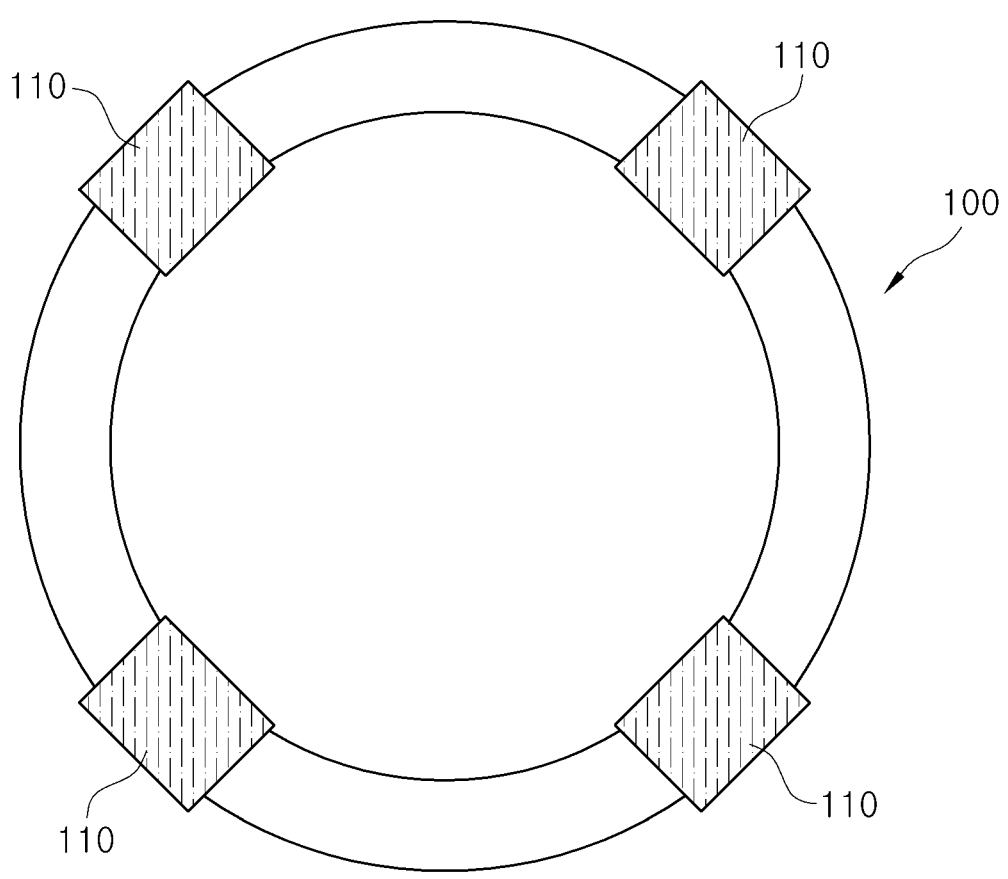
FIG. 4 is a front view illustrating the piston provided with a plurality of suction plates according to the embodiment of the present disclosure.

FIG. 4 is a front view illustrating the piston 100 provided with a plurality of suction plates 110 according to the embodiment of the present disclosure.

Referring to FIG. 4, a layout in which the plurality of suction plates 110 are provided on the hollow piston 100 is provided. Specifically, according to the embodiment of the present disclosure, the plurality of suction plates 110 are disposed on an edge of the front surface of the piston 100. In this case, the suction plate 110 may be disposed at a predetermined distance from an adjacent suction plate 110 and may also be reflectively symmetrically disposed with respect to the axis of the piston 100.

However, sizes, the number, and the layout of the suction plates 110 in the present disclosure are not limited to the embodiment of the present disclosure, and the embodiment of the present disclosure include any size, number, and layout appropriately selected according to the types of brake and piston 100. As an example, the plurality of suction plates 110 may be disposed in contact with each other so that the suction plates 110 cover the 360-degree front surface of the hollow piston 100.

In the caliper brake having such a configuration according to the present embodiment, the suction plates 110 are provided on the front surface of the piston 100 to suction the back plate 200 when the piston 100 moves forward, and when the piston 100 moves backward, an external force is generated using a suction force of the suction plate 110 so that the back plate 200 moves backward with the piston 100 to prevent the drag torque phenomenon in which the brake pad is in contact with the brake disc in a braking state of the vehicle, and thus fuel efficiency of the vehicle can be improved. The suction plate 110 may be formed of a material such as metal, a plastic, or rubber to minimize an increase in weight of the vehicle. In addition, since the shape of the suction plate 110 and a coupling structure in which the suction plate 110 is fixed to the piston 100 are simple, costs of the vehicle are reduced, productivity is improved, and thus marketability is also improved.

According to the spirit of the present disclosure, a caliper brake capable of preventing a drag torque phenomenon in which a brake pad comes into contact with a brake disc in a braking state of a vehicle is provided.

According to the spirit of the present disclosure, a caliper brake of which fuel efficiency of a vehicle is improved is provided.

According to the spirit of the present disclosure, a caliper brake capable of preventing a drag torque phenomenon of a vehicle using a simple configuration and coupling structure to reduce costs of the vehicle and improve productivity.

What is claimed is:

1. A caliper brake comprising:

a piston (100) configured to move forward and backward in an axial direction; and a back plate (200) provided to face a front side of the piston (100), wherein the piston (100) is provided with a plurality of suction plates (110) provided on a front surface of the piston (100), each suction plate (110) having a center concavely formed rearward to adsorb the back plate (200) during the piston (100) moving forward, wherein the plurality of suction plates (110) are disposed on an edge of the front surface of the piston (100) and are radially symmetrically disposed with respect to an axis of the piston (100), and wherein, upon a forward movement of the piston (100), a space provided in the center of each suction plate (110) is reduced in size and air present in the space is discharged to the outside so that the respective suction plate (110) adsorbs the back plate (200), and when the piston (100 moves backwards, pulls the back plate (200) rearward together with the piston (100) in order to prevent a drag torque problem.

2. The caliper brake of claim 1, wherein at least one of the suction plates (110) is disposed to be spaced apart from an adjacent suction plate (110).

3. The caliper brake of claim 1, wherein the piston (100) includes a screw or a rivet configured to fix at least one of the suction plates (110) to the front surface.

4. The caliper brake of claim 1, wherein at least one of the suction plates (110) is formed of at least one of a metal, a plastic, and rubber.

* * * * *